(12) United States Patent
Yona et al.

(10) Patent No.: US 8,515,339 B2
(45) Date of Patent: Aug. 20, 2013

(54) METHOD AND AN APPARATUS FOR INSTALLING A COMMUNICATION SYSTEM USING ACTIVE COMBINER/SPLITTERS

(75) Inventors: Eli Yona, Binyamina (IL); Haim Weissman, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/144,001

(22) Filed: May 10, 2002

(65) Prior Publication Data

US 2003/0040329 A1 Feb. 27, 2003

Related U.S. Application Data

(60) Provisional application No. 60/290,247, filed on May 10, 2001.

(51) Int. Cl.
*H04B 3/36* (2006.01)
*H04B 7/14* (2006.01)

(52) U.S. Cl.
USPC .......... 455/7; 455/15; 455/16; 455/561; 455/127.1; 455/115.1; 455/80

(58) Field of Classification Search
USPC .......... 455/7, 15, 16, 561, 127.2, 127.3, 455/115.1, 115.2, 80, 127, 115
See application file for complete search history.

(56) References Cited

U.S. PATENT DOCUMENTS

| | | | |
|---|---|---|---|
| 4,901,307 A | 2/1990 | Gilhousen et al. | |
| 4,910,791 A | 3/1990 | Dickinson et al. | |
| 5,115,514 A | 5/1992 | Leslie | |
| 5,220,419 A * | 6/1993 | Sklar et al. | 455/234.2 |
| 5,233,626 A | 8/1993 | Ames | |
| 5,319,700 A | 6/1994 | Mano et al. | |
| 5,404,570 A | 4/1995 | Charas et al. | |
| 5,457,557 A * | 10/1995 | Zarem et al. | 398/116 |
| 5,513,176 A | 4/1996 | Dean et al. | |
| 5,530,449 A * | 6/1996 | Wachs et al. | 342/174 |
| 5,603,080 A | 2/1997 | Kallander et al. | |
| 5,661,434 A | 8/1997 | Brozovich et al. | |
| 5,668,562 A * | 9/1997 | Cutrer et al. | 455/67.11 |
| 5,754,943 A | 5/1998 | Arai et al. | |
| 5,774,789 A * | 6/1998 | van der Kaay et al. | 455/16 |

(Continued)

FOREIGN PATENT DOCUMENTS

| | | |
|---|---|---|
| DE | 4303094 A1 | 8/1994 |
| DE | 4335345 A1 | 4/1995 |

(Continued)

OTHER PUBLICATIONS

Newton's Telecom Dictionary 20$^{th}$ Edition, Harry Newton, CMP Books, pp. 83 and 652.*

(Continued)

*Primary Examiner* — Wen Huang
(74) *Attorney, Agent, or Firm* — Howard Seo (57) ABSTRACT

A method and apparatus that allows off-the-shelf equipment to be installed in a wide range of physical sites having a wide range of distances between a master system unit and each of a plurality of remote units. The master system unit has an integrated active combiner/splitter. The active combiner/splitter provides bi-directional gain or attenuation in each of the individual inputs/outputs to allow control of the signal level.

42 Claims, 4 Drawing Sheets

(56) References Cited

U.S. PATENT DOCUMENTS

| | | | |
|---|---|---|---|
| 5,867,763 | A | 2/1999 | Dean et al. |
| 5,890,055 | A | 3/1999 | Chu et al. |
| 5,898,337 | A | 4/1999 | Inahasi |
| 5,930,293 | A | 7/1999 | Light et al. |
| 5,930,726 | A | 7/1999 | Fujita |
| 5,946,622 | A * | 8/1999 | Bojeryd ............ 455/444 |
| 6,002,918 | A | 12/1999 | Heiman et al. |
| 6,005,884 | A | 12/1999 | Cook et al. |
| 6,072,788 | A * | 6/2000 | Peterson et al. ........ 370/337 |
| 6,078,823 | A | 6/2000 | Chavez et al. |
| 6,088,003 | A | 7/2000 | Bassirat |
| 6,125,109 | A | 9/2000 | Fuerter |
| 6,127,972 | A * | 10/2000 | Avidor et al. ........... 342/373 |
| 6,157,818 | A | 12/2000 | Rode |
| 6,178,334 | B1 | 1/2001 | Shyy et al. |
| 6,229,855 | B1 * | 5/2001 | Takatori et al. ........ 375/296 |
| 6,272,351 | B1 | 8/2001 | Langston et al. |
| 6,342,777 | B1 | 1/2002 | Takahashi |
| 6,373,832 | B1 | 4/2002 | Huang et al. |
| 6,374,119 | B1 * | 4/2002 | Jun et al. ............ 455/523 |
| 6,449,477 | B1 | 9/2002 | Weissman |
| 6,501,942 | B1 * | 12/2002 | Weissman et al. ......... 455/14 |
| 6,546,254 | B2 | 4/2003 | Fitzgerald |
| 6,587,686 | B1 | 7/2003 | Cuffaro et al. |
| 6,640,110 | B1 * | 10/2003 | Shapira et al. ........ 455/562.1 |
| 6,694,127 | B2 * | 2/2004 | Yona et al. ........... 455/67.11 |
| 6,704,545 | B1 * | 3/2004 | Wala .................. 455/16 |
| 6,801,767 | B1 * | 10/2004 | Schwartz et al. ....... 455/426.2 |
| 6,819,936 | B2 | 11/2004 | Weissman |
| 7,039,357 | B2 | 5/2006 | Weissman et al. |
| 7,085,530 | B2 | 8/2006 | Weissman |
| 7,096,173 | B1 * | 8/2006 | Rappaport et al. ...... 455/422.1 |
| 2002/0039885 | A1 | 4/2002 | Weissman et al. |
| 2002/0167490 | A1 | 11/2002 | Weissman et al. |

FOREIGN PATENT DOCUMENTS

| | | |
|---|---|---|
| EP | 0674452 A2 | 9/1995 |
| EP | 0756392 A2 | 1/1997 |
| EP | 0851606 A2 | 7/1998 |
| EP | 0884863 A2 | 12/1998 |
| EP | 0884915 A2 | 12/1998 |
| EP | 0987832 A2 | 3/2000 |
| EP | 1022849 | 7/2000 |
| GB | 2134678 A | 8/1984 |
| WO | WO9927720 | 6/1999 |
| WO | WO0069116 A2 | 11/2000 |

OTHER PUBLICATIONS

Burke, et al., "Cellular Coverage in Buildings/Tunnels", Proceedings of the National Communications Forum, Notional Engineering Consortium Inc. Oak Brook, Illinois, US, vol. 43, No. 2, Oct. 2, 1989, pp. 892-900, XP000225001.

Lemieux J-F et al., "Experimental Evaluation of Space/Frequency/Polarization Diversity in the Indoor Wireless" Vehicular Technology, IEEE Transactions on, 'online! Aug. 1991 1991-08, pp. 569-574, XP002193035. <URL: http://ieeexplore.ieee.org/>.

* cited by examiner

METHOD AND AN APPARATUS FOR INSTALLING A COMMUNICATION SYSTEM USING ACTIVE COMBINER/SPLITTERS

RELATED APPLICATIONS

This application claims priority to U.S. Provisional Application No. 60/290,247, filed on May 10, 2001.

BACKGROUND OF THE INVENTION

1. Field of the Invention

The present invention relates generally to wireless communications, and more particularly to a method and apparatus for automatically adjusting the amount of gain or loss in a communication system in which signals are relayed between a master system unit and a remote unit in order to compensate for varied environments.

2. Description of the Related Art

Modern communications systems are an important part of our society today. One such communications system is a wireless cellular communication system. In wireless cellular communication systems, communications between users are conducted through one or more base stations. The term forward link is used to refer to communications from a base station to a subscriber station, and the term reverse link is used to refer to communications from a subscriber station to a base station. A subscriber station is the device that is used by an individual who subscribes to a communication provider for communication services. For example, a person who uses a conventional cellular telephone is a subscriber to the cellular telephone services provided by a cellular telephone service provider, such as Leap Wireless International Inc.

By transmitting information on a reverse link to a base station, a subscriber may communicate with people at other locations through any one of a number of communications systems, including conventional telephones, cellular telephones, or the Internet. The base station receives the information (voice or data) from the first subscriber station and routes the information to a Base Station Controller (BSC). The base station controller routes the information to a Mobile Switching Controller (MSC). The base station serving the subscriber stations sends the information back to the subscriber on the forward link.

As a subscriber station moves about a wireless cellular communication system, the quality of the forward and reverse links to transmit data will vary. In particular, a user of a subscriber station may move inside a building or enter an area in which signals are blocked, such as a tunnel or valley. When the user does so, the subscriber station may not be able to operate due to the low energy level in the signal that is available to and from the subscriber station.

One solution to this problem is to establish a relay station that can receive signals from a base station and relay (i.e., retransmit) those signals to the user's subscriber station. However, in complex structures, such as buildings having several floors and corridors, a simple relay station is not effective. Accordingly, another approach is to place a master system unit at a location from which signals to and from a base station can be transmitted and received, respectively. Signals are then communicated over a wire line to a remote unit. The remote unit transmits information received from the base station via the master system unit to subscriber stations within an area into which signals transmitted directly from the base cannot easily be received. Likewise, the remote unit receives information from subscriber stations within the area. The remote unit then communicates the information received from the subscriber stations over wire lines to the master system unit. The master system unit communicates the information over the air to the base station.

One significant problem with such a configuration of the master system unit and remote units is that the design and installation of such a system is expensive and complex. One of the reasons for this is that the distances between the master system unit and the remote units are not known until the installation site has been selected. Therefore, each system must be customized to the site to account for the particular physical relationship between the master system unit and the remote units. Furthermore, while it is preferable to have as many remote units coupled to one master unit as possible in order to reduce the cost of the system, there is a trade-off between the distance that a remote unit can be from the master system unit, and the number of remote units that can be connected to the master system unit. That is, the more remote units the master system unit has to drive, the shorter the cable has to be between each remote unit and the master system unit. One way to resolve this problem is to add gain (i.e., using amplifiers to boost the signal) at the master system unit and the remote units to increase the length of the wire line between the master system unit and the remote unit. However, by increasing the gain, signals will over-drive the inputs to closer remote units. Therefore, it is difficult to provide off-the-shelf integrated equipment that can be used in the wide range of physical sites in which such equipment is required to operate.

Accordingly, there is a need for a system that allows a master system unit to drive remote units at a greater distance while accommodating a broad range of physical configurations.

SUMMARY OF THE INVENTION

In accordance with one aspect of the invention, provided is a system that allows off-the-shelf equipment to be installed in a very wide range of physical sites having a wide range of distances between a master system unit and each of a plurality of remote units. The master system unit has an integrated active combiner/splitter. The active combiner/splitter provides bi-directional gain or attenuation in each of the individual input/output ports to allow control of the signal level.

In accordance with another aspect of the present invention, provided is a master system unit for use in a wireless communication system. The master system unit includes an input port, an output port, a plurality of bi-directional ports, and a combiner/splitter. The combiner/splitter is coupled to the input port, the output port, and the plurality of bi-directional ports. The combiner/splitter further comprises a splitter, a combiner, a first circuit, and a second circuit. The splitter is coupled to the input port and the combiner is coupled to the output port. The first circuit includes a first attenuator coupled to the splitter and a first amplifier. The first amplifier is coupled to a duplexer which is coupled to one of the plurality of bi-directional ports and a second amplifier. The second amplifier is coupled to a second attenuator which is coupled to the combiner. The second circuit includes a third attenuator coupled to the splitter and a third amplifier. The third amplifier is coupled to a duplexer which is coupled to one of the plurality of bi-directional ports and a fourth amplifier. The fourth amplifier is coupled to a fourth attenuator which is coupled to the combiner.

The master system unit may further include a processor that is coupled to each attenuator. The processor receives information regarding power levels at points outside the master system unit and sets the gain of each attenuator in response to the power levels.

The master system unit may further include a user input port for a user to provide information to the processor. The information includes estimates of the length of wire line to be connected between the master system unit and remote units. Each estimate may be associated with one of the master system unit bi-directional ports. The processor sets the gain of each attenuator in response to the provided estimates. The master system unit may further include a modem for providing communication between the master system unit and a user or external device. The master system unit may further include a memory coupled to the processor for providing storage of data.

In accordance with another aspect of the present invention, provided is a method for adjusting the gain of a signal received by a master system unit. The master system unit includes a combiner/splitter for adjusting the gain of the signal comprising the steps of splitting the signal into a plurality of signals, adjusting the gain of each signal based on predetermined gain parameters, wherein the gain is adjusted by individually controlling the attenuation of each signal, amplifying and outputting each signal, receiving signals from a plurality of remote units, amplifying each signal received from the plurality of remote units, adjusting the gain of each signal based on predetermined gain parameters, wherein the gain is adjusted by individually controlling the attenuation of each signal, and combining each of the signals and outputting a combined signal.

In accordance with another aspect of the present invention, provided is a method for installing a master system unit and a remote unit, the master system unit being coupled to the remote unit by a wire line. The method comprising the steps of estimating the length of the wire line between the master system unit and the remote unit, setting gain elements in the master system unit to a specified gain based on the initial estimate, transmitting a test signal into an RF input of the master system unit, detecting and estimating the amount of power at points in the wire line between the master system unit and remote unit, and adjusting the gain elements in the master system unit and the remote unit based on the estimate.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Understanding of the present invention will be facilitated by consideration of the following detailed description of an exemplary embodiment of the present invention taken in conjunction with the accompanying drawings, in which like numerals refer to like part and in which.

DETAILED DESCRIPTION OF THE PREFERRED EMBODIMENTS

Figure 1:
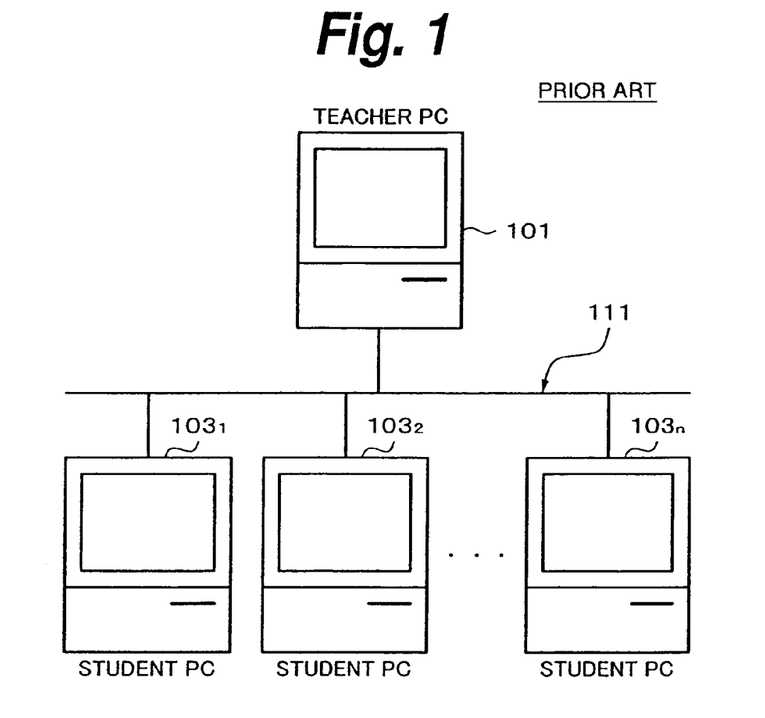
FIG. 1 is a block diagram illustrating an in-building communication system according to the present invention.

FIG. 1 illustrates an in-building communication system 100, which is disclosed in pending patent application entitled "In-building Radio Frequency Coverage," Ser. No. 09/430,616, filed on Oct. 29, 1999. U.S. Pat. No. 6,501,942, which is assigned to the assignee of the present invention and which is incorporated herein by reference in its entirely as if set forth in full herein. The communication system 100 includes a base station 102 that transmits radio-frequency (RF) signals to an antenna 104, which is preferably on top of building 106. Preferably, the RF signal emitted by the base station 102 is a code division multiple access (CDMA) signal.

A master system unit 108 which is preferably located within the building 106 receives the RF signals transmitted from the base station 102. The base station 102 and the master system unit 108 communicate over the air or via a cable by utilizing a cellular network, digital network, coaxial cable, ethernet cable, or fiber optic lines.

The master system unit 108 relays the received signals to remote units 110a-110f over wire lines 114. The remote units 110 transmit the received signals to one or more subscriber stations 112 located within the building 106. The subscriber station 112 is adapted to receive signals emitted by the base station 102. One or more subscriber stations 112 is configured to transmit signals to a corresponding remote unit 110, and the information in the signals is transferred to the master system unit 108 over wire lines 114. The master system unit 108 transmits the signals comprising the information received from one or more subscriber stations 112 to the base station 102.

The wire lines 114 between the master system unit 108 and each remote unit 110 may be relatively lengthy. For example, if the master system unit 108 is on top of a tall building (e.g., 40th floor) and a remote unit 110 is located on the lowest floor (e.g., $1^{st}$ floor), the wire line 114 between the master system unit 108 and the remote unit 110 can be as long as several hundred meters. The master system unit 108 and the remote units 110 have the ability to compensate for degradation of signals that occur due to the losses experienced from the length of the wire lines 114. In particular, the master system unit 108 and the remote units 110 can adjust the gain of signals transmitted between the master system unit and the remote units.

Figure 2:
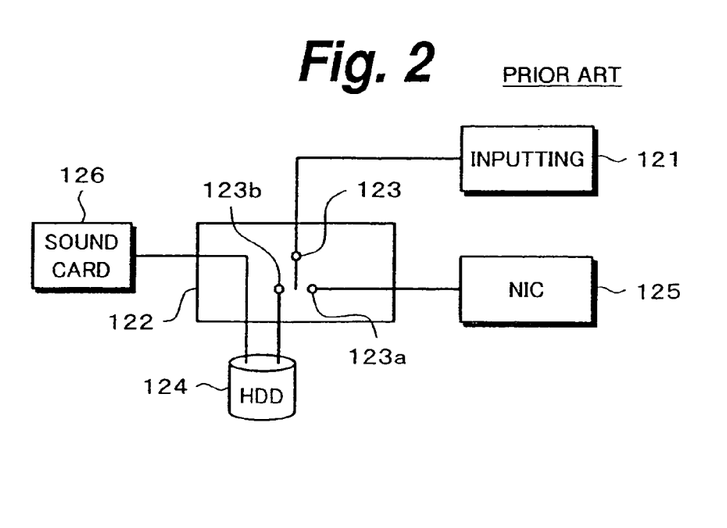
FIG. 2 is a block diagram of an implementation example of a master system unit according to the present invention.

FIG. 2 is a block diagram of an implementation example of an master system unit 200 including combiner/splitter 202 and input/output ports 204. The master system unit 200 down converts received RF signals to forward intermediate frequency (IF) signals. The forward IF signals are then transferred to remote units. The master system unit 200 adjusts the gain of the received signals by the active combiner/splitter 202.

The active combiner/splitter 202 provides bi-directional gain or attenuation in each of the individual input/output ports 204 to allow adjustment of each signal level through the use of attenuators. This allows signals that are intended for use with remote units that are relatively nearby to be coupled to the wire line between the master system unit 200 and the remote unit at relatively low power level. This reduces the amount of radiation and prevents the inputs of those nearby remote units from being saturated. Alternatively, the signal output from the master system unit 200 may be coupled to the wire line between the master system unit 200 and the remote unit at a relatively high power level in order to ensure that the signal is received at a distant remote unit with sufficient power.

The combiner/splitter 202 is configured as an integrated active unit or as separate combiner and splitter units. In one implementation example, the combiner/splitter 202 comprises a combiner coupled to the master system unit 200, a splitter coupled to the master system unit, a plurality of attenuators including a first plurality of attenuators coupled to the splitter and a second plurality of attenuators coupled to the combiner, a plurality of amplifiers including a first plurality of amplifiers coupled to the first plurality of attenuators and a second plurality of amplifiers coupled to the second plurality of attenuators, and a plurality of duplexers coupled to the first plurality of amplifiers, the second plurality of amplifiers, and the master system unit 200. The schematic details of this implementation example of the combiner/splitter 202 are illustrated and described below in reference to FIG. 3.

The master system unit 200 may further include processor 206. In this implementation, the processor 206 is coupled to the combiner/splitter 202 for setting the gain elements (i.e., attenuators) of the combiner/splitter. In one implementation example, the processor 206 adjusts the gain parameters of the combiner/splitter 202, in response to, receiving information regarding the power levels at points outside the master system unit 200.

The processor 206 automatically calibrates the amount of attenuation during an initialization process. For example, an installer transmits a test signal into an RF input of the master system unit 200. Detectors at strategic locations in the circuit estimate the amount of power that is present at each location. The detected amount of power is communicated to the processor 206. In response, the processor 206 determines the proper gain parameters to set gain elements (i.e., attenuators) in the remote unit and the master system unit 200.

The master system unit 200 may further include memory 208. In this implementation, the memory 208 is coupled to the processor 206 for temporary or permanent storage of data. The memory 208 is preferably volatile memory providing for the processor 206 to store data during processing. For example, the memory may be, but not limited to, a memory chip, RAM, SRAM, DRAM, EPROM, flash memory, or related memory device. The memory 208 may include more than one memory element such as two or more memory chips.

The master system unit 200 may further include user ports providing for a user or external device the ability to communicate information to the processor 206. The user ports provide for connection to a cable, telephone line, network connection, or related communication connection. In one example, the user port can be a network card or modem 210. The master system unit 200 contains all the necessary software for communicating with and processing requests or commands from a user or external device. The software may be stored in the memory 208 or a storage device located in the master system unit 200. For example, the storage device may be, but not limited to, a hard drive, CD-ROM, DVD, optical medium, flash memory, floppy disk, or other related storage device.

The modem 210 communicates with the processor 206 and allows users to provide information to the processor. The information includes, but is not limited to, gain parameters, estimates of the length of wire line to be connected between the master system unit and a remote unit, master system unit control parameters, remote unit control parameters, and other system information. The user can communicate with the modem 210 using different communication mediums such as a telephone line, network connection, or the Internet.

For example, a user communicates with the modem 210 over a telephone line with a computer. The user connects to the modem 210 and transmits information regarding estimates of the length of wire line to be connected between the master system unit 200 and remote units. The modem 210 responds by transmitting the received information to the processor 206. In response to the provided estimates, the processor 206 sets the gain of each attenuator by submitting new gain parameters. Additionally, a user or external device may request information from the processor 206 through the modem 210. The requested information can include, but is not limited to, master system unit status, remote unit status, master system unit control parameters, remote unit control parameters, wire line conditions, gain parameters settings and other related system information.

The master system unit 200 may further include a power supply for powering the master system unit 200, active combiner/splitter 202, processor 206, memory 208, modem 210, remote units, and other system components. The power supply is configured to supply singularly or in combination AC and/or DC current.

Figure 3:
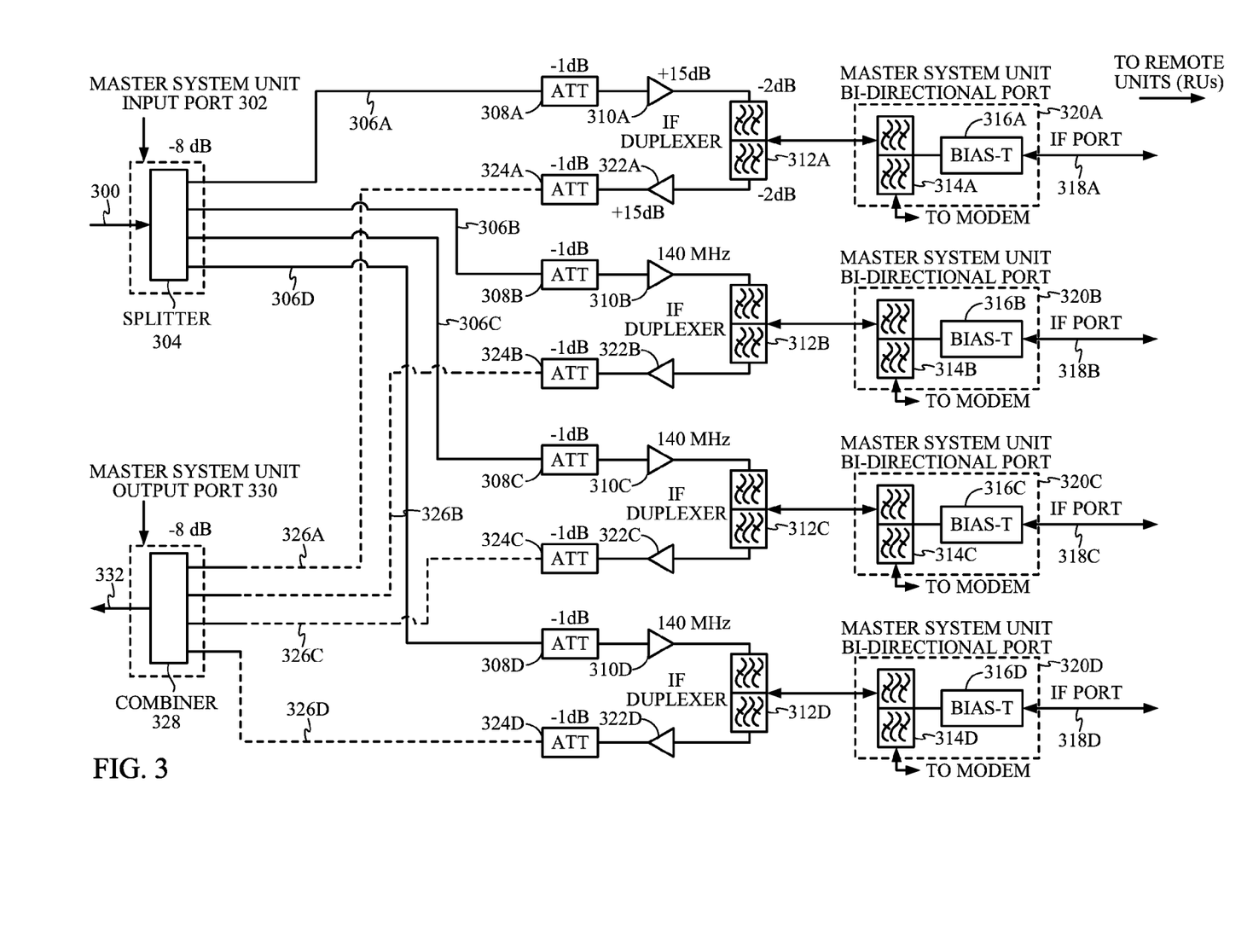
FIG. 3 is a schematic diagram of an implementation example of a combiner/splitter of the master system unit according to the present invention.

FIG. 3 is a schematic diagram of an implementation example of a combiner/splitter of the master system unit. The master system unit includes a master system unit input port 302, a master system unit output port 330, and master system unit bi-directional ports 320$a$-320$d$. The master system unit input port 302 is coupled to the input port of splitter 304. The splitter 304 has a plurality of splitter output ports that are each coupled to an input port of attenuators 308$a$-308$d$ for receiving signals 306$a$-306$d$. The output ports of the attenuators 308 are coupled to the input ports of amplifiers 310$a$-310$d$. The amplifiers 310 output ports are coupled to the input ports of IF duplexers 312$a$-312$d$. The IF duplexers 312 further include bi-directional ports and output ports.

The IF duplexers 312 bi-directional ports are coupled to the input ports of duplexers 314$a$-314$d$ contained in the master system unit bi-directional ports 320$a$-320$d$. The duplexers 314 provide bi-directional ports for communication with a modem and are coupled to the inputs ports of bias-Ts 316$a$-316$d$. The bias-Ts 316 provide for outputting signal 318$a$-318$d$ to a corresponding remote unit over wire lines.

The IF duplexers 312 output ports are coupled to the input ports of amplifiers 322$a$-322$d$. The amplifiers 322 output ports are coupled to the input ports of attenuators 324$a$-324$d$. The attenuators 324 output ports are coupled to the input ports of combiner 328. The combiner 328 is coupled to the master system unit output port 330 and provides for generating a combined signal 332 from signals 326$a$-326$d$ received from the attenuators 324.

In one implementation example, during operation the master system unit input port 302 receives signal 300 which is transferred to the splitter 304. The splitter 304 splits the signal 300 into separate signals 306, and transfers each signal to the inputs of corresponding attenuators 308. For example, signal 306$a$ is transferred to the input of attenuator 308$a$. The attenuators 308 provide for adjusting the gain of each signal by individually controlling the amount of attenuation of each signal. Initially, the amount of attenuation is based on predetermined gain parameters. The gain parameters of each attenuator can be individually changed responsive to power or system changes. The gain parameters can be in the form of decibels (dB) or other attenuation settings. In one implementation example, a processor is coupled to each of the attenuators to provide for adjusting the gain parameters of each attenuator. For example, the processor receives updated power measurement information, and in response, submits new gain parameters to one or more attenuators.

The attenuators 308 adjust the gain of each of the signals 306 based on predetermined gain parameters by individually controlling the attenuation of each signal. The adjusted signals are transferred to the inputs of amplifiers 310. The amplifiers 310 amplify and output each signal to the input of IF duplexers 312. The IF duplexers 312 output each signal from the duplexer bi-directional port to the input of duplexers 314 contained in the master system unit bi-directional ports 320. The duplexers 314 each provide a bi-directional port for communication with a modem and transfer the signals to the inputs of the bias-Ts 316. The bias-Ts 316 each output signals 318 to a corresponding remote unit over the wire lines. The bias-Ts 316 enable both IF and DC signals to be applied to a single wire line. The bias-Ts 316 each provide a reliable method for powering the remote units with a low-voltage DC and thus eliminates the need to install power outlets at each remote unit. The output signals 318 each include the IF signals along with a DC signal for powering a corresponding remote unit.

In another implementation example, remote units coupled to the master system unit transfer IF signals 318 which are received by the master system unit bi-directional ports 320. The bias-T's 316 output the signals to duplexers 314. The duplexers 314 transfer the signals to the duplexer bi-directional port of the IF duplexers 312. The IF duplexers 312 output each signal from the output ports to the input of amplifiers 322. The amplifiers 322 amplify and output each signal to the inputs of the attenuators 324. The attenuators 324 provide for adjusting the gain of each signal by individually controlling the amount of attenuation of each signal. The adjusted signals 326 are transferred to the inputs of the combiner 328. The combiner 328 combines signals 326 into a combined signal 332 which is transferred from the combiner to the master system unit output port 330.

Figure 4:
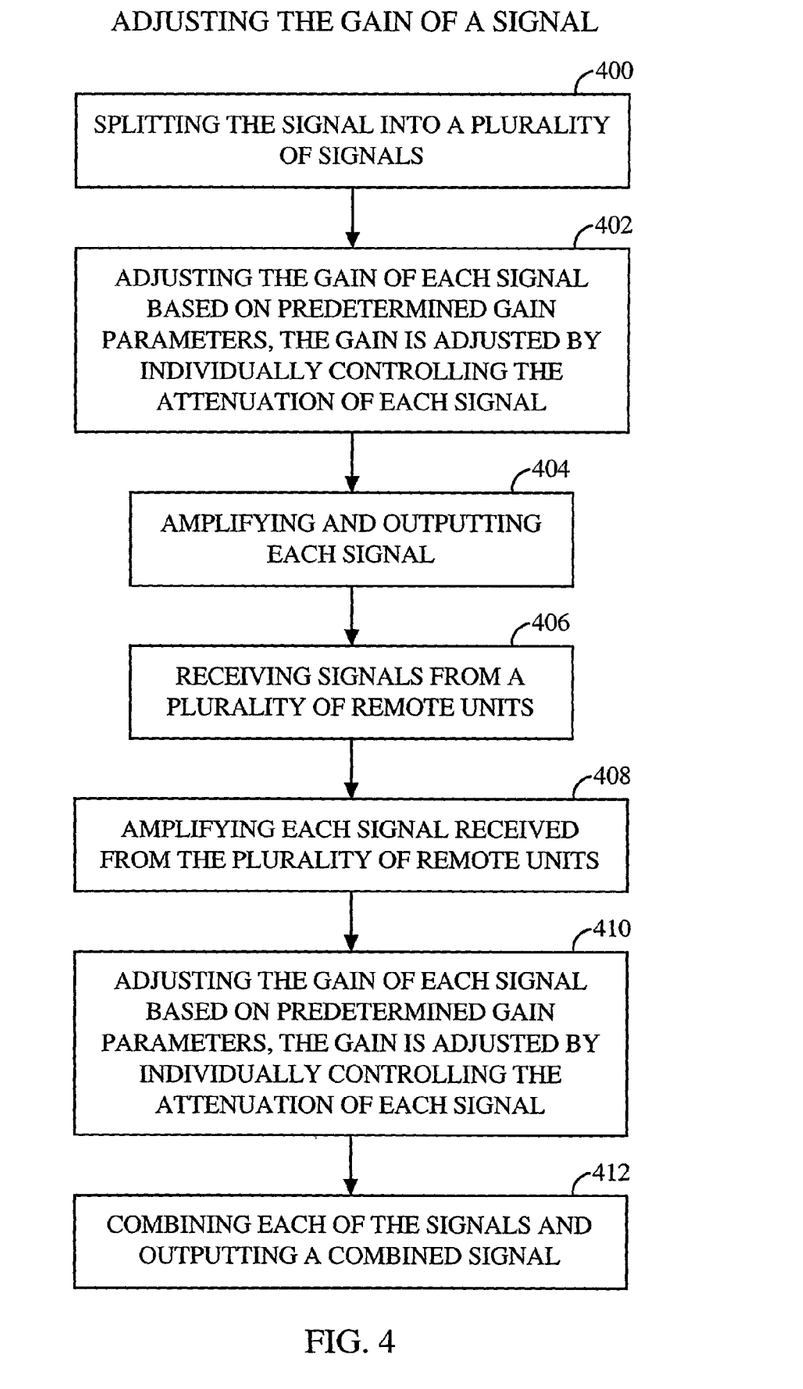
FIG. 4 is a flowchart illustrating a method for adjusting the gain of a signal received by a master system unit according to the present invention.

FIG. 4 is a flowchart illustrating a method for adjusting the gain of a signal received by the master system unit. In step 400, the signal is split into a plurality of signals. In step 402, the gain of each signal is adjusted based on predetermined gain parameters. The gain is adjusted by individually controlling the attenuation of each signal. In step 404, each signal is amplified and output to a corresponding remote unit. In step 406, signals are received from a plurality of remote units. In step 408, each signal received from the plurality of remote units is amplified. In step 410, the gain of each signal is adjusted based on predetermined gain parameters. The gain is adjusted by individually controlling the attenuation of each signal. In step 412, each of the signals is combined and a combined signal is output.

In one implementation example, the master system unit 200 receives a signal. The combiner/splitter 202 includes a splitter that splits the signal into a plurality of signals that are transferred to a plurality of attenuators. The attenuators adjust the gain of each signal based on predetermined gain parameters by individually controlling the attenuation of each signal. The adjusted signals are each output to an amplifier. Each amplifier amplifies and outputs the signals to a plurality of remote units. The combiner/splitter 202 receives signals from the plurality of remote units. Each signal is amplified by a plurality of amplifiers and output to a plurality of attenuators. The attenuators adjust the gain of each signal based on predetermined gain parameters. The attenuators output each adjusted signal to a combiner. The combiner combines each of the signals and outputs a combined signal.

Figure 5:
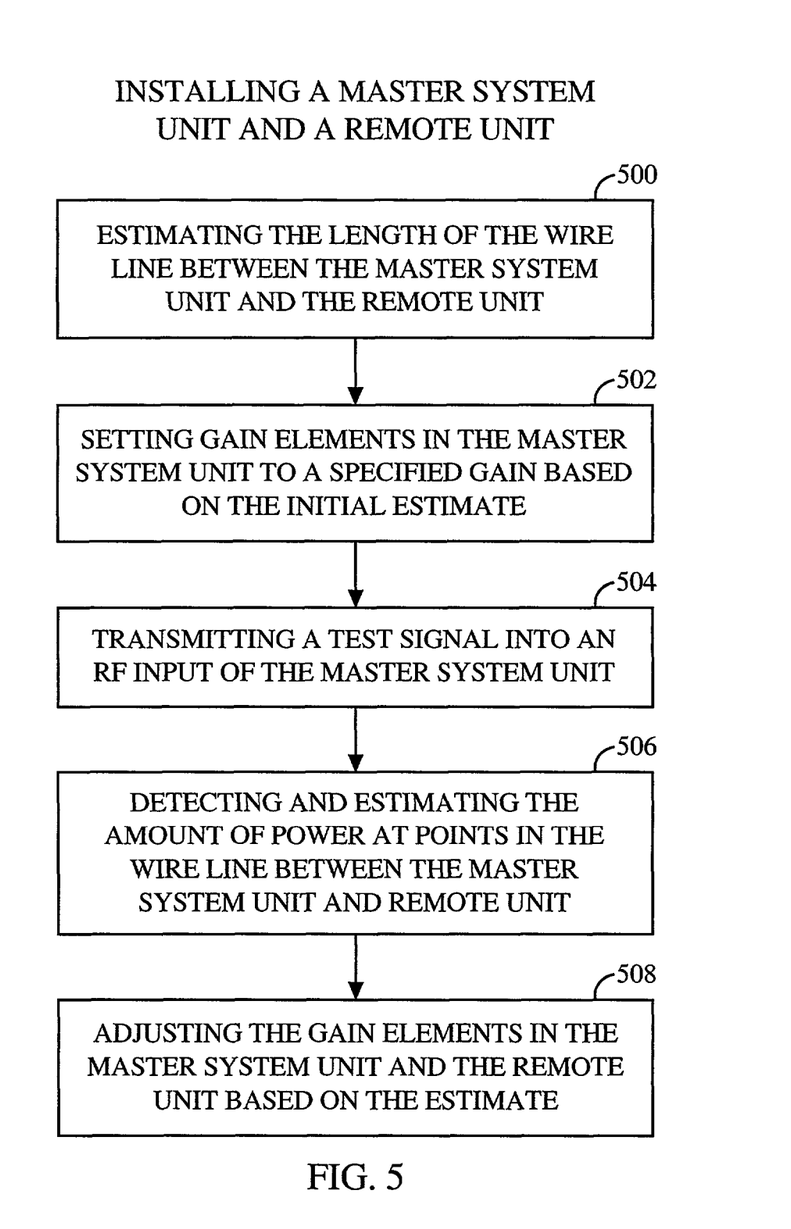
FIG. 5 is a flowchart illustrating a method for installing a master system unit and a remote unit according to the present invention.

FIG. 5 is a flowchart illustrating a method for installing a master system unit and a remote unit. In one implementation example, referring to FIG. 1, the master system unit 108 is coupled to the remote unit 116 by wire line 110. The installation method begins, in step 500, by estimating the length of the wire line 110 between the master system unit 108 and the remote unit 116. The length of wire lines between the master system unit and the remote units will vary depending upon placement of the remote units. For example, one remote unit may be 100 meters from the master system unit while another may be 200 meters from the master system unit. Due to losses that occur during signal transmission in the wire lines, the remote unit that is 200 meters away will need a stronger signal to be sent from the master system unit, as compared to the remote unit 100 meters away.

In step 502, gain elements are set in the master system unit to a specified gain based on the initial estimate. For example, the gain elements are attenuators or other devices that provide for controlling the attenuation of signals. The gain/attenuation in each port 204 of the active combiner/splitter 202 is first estimated to be either full power (i.e., minimum attenuation) or minimum power (i.e., maximum attenuation) depending upon an initial estimate of the wire line length. During installation, an installer indicates on a terminal connected to the master system unit whether the wire line is greater than or less than a predetermined length. For example, if the length of the wire line is estimated to be greater than 150 meters, then the attenuators are reduced to a zero decibel (dB) setting. If the length of the wire line is estimated to be less than 150 meters, then the attenuation is increased to the maximum amount (e.g., 12 decibels).

In step 504, a test signal is transmitted into an RF input of the master system unit. The test signal is of a predetermined level. For example, an installer can inject the signal into the RF input (e.g., input/output ports 204) during the installation process. In step 506, the amount of power at points in the wire line between the master system unit and the remote unit is detected and estimated. Detectors at strategic locations in the circuit estimate the amount of power that is present at each location. The amount of power can be the instantaneous power or average power over time at each location. In step 508, the gain elements in the master system unit and the remote unit are adjusted based on the estimate.

In one implementation example, the processor 206 controls the amount of attenuation of signals received by each attenuator by adjusting the gain parameters of each attenuator. During the installation process, the processor 206 automatically calibrates the amount of attenuation for each attenuator during an initialization process. The processor 206 receives estimates of the amount of power detected at different locations in the wire line. The processor 206 then determines the proper gain parameters to set the attenuators in the remote unit and master system unit 200 in response to the estimates. The processor 206 then updates the gain parameters in one or more attenuators.

Although this invention has been shown and described with respect to detailed embodiments, those skilled in the art will understand that various changes in form and detail may be made without departing from the scope of the claimed invention.

What is claimed is:

1. A master system unit for use in a wireless communication system, the master system unit including an input port, an output port, a plurality of bi-directional ports, a combiner/splitter, and a processor, the combiner/splitter further comprising:
   a) a splitter coupled to the input port and configured to provide a plurality of separate signals based, at least in part, on a received signal;
   b) a combiner coupled to the output port and configured to combine a plurality of adjusted signals;

c) a first circuit comprising a first attenuator coupled to the splitter and configured to attenuate a first one of said separate signals based, at least in part, on a first gain parameter and a first amplifier configured to amplify said attenuated first one of said separate signals, the first amplifier being coupled to a first duplexer, the first duplexer being coupled to a first one of the plurality of bi-directional ports and a second amplifier configured to amplify a first signal received from said first one of the bi-directional ports, the second amplifier being coupled to a second attenuator configured to attenuate said amplified first signals received from said first one of the bi-directional ports, to provide a first one of said adjusted signals based, at least in part, on a second gain parameter, the second attenuator being coupled to the combiner; and d) a second circuit comprising a third attenuator coupled to the splitter and configured to attenuate a second one of said separate signals based, at least in part, on a third gain parameter and a third amplifier configured to amplify said attenuated second one of said separate signals, the third amplifier being coupled to a second duplexer, the second duplexer being coupled to a second one of the plurality of bi-directional ports and a fourth amplifier configured to amplify a second signal received from said second one of the bi-directional ports, the fourth amplifier being coupled to a fourth attenuator configured to attenuate said amplified second signal received from said second one of the bi-directional ports, to provide a second one of said adjusted signals based, at least in part, on a fourth gain parameter, the fourth attenuator being coupled to the combiner;

the processor being configured to automatically adjust an amount of gain applied individually to said separate signals and said adjusted signals by determining said first, second, third and fourth gain parameters, wherein at least one of the plurality of bi-directional ports is configured to pass an intermediate-frequency (IF) signal; and wherein the master system unit further comprises a user port configured to communicatively couple the processor and a user, wherein the user port is further configured to exchange information between the processor and the user including communication allowing the user to provide information to the processor.

2. The master system unit of claim 1, wherein the processor is configured to receive information regarding power levels at points outside the master system unit and determine at least one of said gain parameters in response to the power levels.

3. The master system unit of claim 1, wherein the information comprises estimates of the length of wire line to be connected between the master system unit and a remote unit, each estimate being associated with one of the plurality of bi-directional ports and wherein the processor is configured to determine at least one of said gain parameters in response to the provided estimates.

4. The master system unit of claim 1, further comprising a memory coupled to the processor.

5. The master system unit of claim 1, wherein the user port further comprises a modem.

6. The master system unit of claim 1, wherein the master system unit is coupled to at least one remote unit.

7. The master system unit of claim 6, further comprising detectors placed at locations between the master system unit and the at least one remote unit, wherein the detectors are configured to detect the amount of power in signals transferred between the master system unit and the at least one remote unit.

8. The master system unit of claim 1, further comprising a power supply coupled to the master system unit.

9. The master system unit of claim 1, wherein the master system unit is wirelessly coupled to a base station, wherein the master system unit is configured to relay the IF signal to or from the base station.

10. The master system unit of claim 1, wherein the at least one of the plurality of bi-directional ports is configured to pass DC power.

11. The master system unit of claim 1, wherein the information comprises system-related information transmitted to the user in response to a user request.

12. The master system unit of claim 1, wherein the user port is further communicatively coupled to a plurality of different communication mediums.

13. A master system unit for use in a wireless communication system, comprising:
a) a master system unit input port;
b) a master system unit output port;
c) a plurality of bi-directional master system unit ports;
d) a passive splitter having a splitter input port and a plurality of splitter output ports, the splitter input port being coupled to the master system unit input port;
e) a passive combiner having a combiner output port and a plurality of combiner input ports, the combiner output port being coupled to the master system unit output port;
f) a first plurality of variable attenuators, each having an attenuator input port and an attenuator output port, each attenuator input port of the first plurality of attenuators being coupled to one of the splitter output ports;
g) a second plurality of variable attenuators, each having an attenuator input port and an attenuator output port, each attenuator output port of the second plurality of attenuators being coupled to one of the combiner input ports;
h) a first plurality of amplifiers, each having an amplifier input port and an amplifier output port, each the amplifier input port being coupled to the attenuator output port of one of the first plurality of attenuators;
i) a second plurality of amplifiers, each having an amplifier input port and an amplifier output port, each amplifier output port being coupled to one of the attenuator input ports of the second plurality of attenuators;
j) a plurality of duplexers, each having a duplexer input port, a duplexer output port and a duplexer bi-directional port, each duplexer input port being coupled to one of the output ports of the first plurality of amplifiers, each duplexer output port being coupled to one of the outputs of the second plurality of amplifiers, and each duplexer bi-directional port being coupled to one of the master system unit bi-directional ports;
k) a processor configured to automatically adjust individual ones of said attenuators to individually control gains of signals transmitted from said splitter output ports and individually control gains of signals received at said combiner input ports; and a user port configured to communicatively couple the processor and a user, wherein the user port is further configured to exchange information between the processor and the user including communication allowing the user to provide information to the processor.

14. The master system unit of claim 13, wherein the processor is configured to receive information regarding power levels at points outside the master system unit and to determine at least one of the gains of individual ones of said signals transmitted from said splitter output ports and said signals received at said combiner input ports in response to the power levels.

15. The master system unit of claim 13, wherein the information comprises estimates of the length of wire line to be connected between the master system unit and a remote unit, each estimate being associated with one of the master system unit bi-directional ports and wherein the processor is configured to determine the gains in response to the provided estimates.

16. The master system unit of claim 13, further comprising a memory coupled to the processor.

17. The master system unit of claim 13, wherein the user port further comprises a modem.

18. The master system unit of claim 13, wherein the master system unit is coupled to at least one remote unit.

19. The master system unit of claim 18, further comprising detectors placed at locations between the master system unit and the at least one remote unit, wherein the detectors are configured to detect the amount of power in signals transferred between the master system unit and the at least one remote unit.

20. The master system unit of claim 13, further comprising a power supply coupled to the master system unit.

21. The master system unit of claim 13, wherein at least one of the plurality of bi-directional ports is configured to pass an IF signal.

22. The master system unit of claim 13, wherein the information comprises system-related information transmitted to the user in response to a user request.

23. The master system unit of claim 13, wherein the user port is further communicatively coupled to a plurality of different communication mediums.

24. A system for adjusting the gain of a signal comprising:
a master system unit including an input port, an output port, a plurality of bi-directional ports, and a combiner/splitter, the combiner/splitter being coupled to the input port, the output port, and the plurality of bi-directional ports, and a processor, the combiner/splitter further comprising:
a) a splitter coupled to the input port and configured to provide a plurality of separate signals based, at least in part, on a received signal;
b) a combiner coupled to the output port and configured to combine a plurality of adjusted signals;
c) a first circuit comprising a first attenuator coupled to the splitter and configured to attenuate a first one of said separate signals based, at least in part, on a first gain parameter and a first amplifier configured to amplify said attenuated first one of said separate signals, the first amplifier being coupled to a first duplexer, the first duplexer being coupled to a first one of the plurality of bi-directional ports and a second amplifier configured to amplify a first signal received from said first one of the bi-directional ports, the second amplifier being coupled to a second attenuator configured to attenuate said amplified first signals received from said first one of the bi-directional ports, to provide a first one of said adjusted signals based, at least in part, on a second gain parameter, the second attenuator being coupled to the combiner;
d) a second circuit comprising a third attenuator coupled to the splitter and configured to attenuate a second one of said separate signals based, at least in part, on a third gain parameter and a third amplifier configured to amplify said attenuated second one of said separate signals, the third amplifier being coupled to a second duplexer, the second duplexer being coupled to a second one of the plurality of bi-directional ports and a fourth amplifier configured to amplify a second signal received from said second one of the bi-directional ports, the fourth amplifier being coupled to a fourth attenuator configured to attenuate said amplified second signal received from said second one of the bi-directional ports, to provide a second one of said adjusted signals based, at least in part, on a fourth gain parameter, the fourth attenuator being coupled to the combiner;
e) at least one remote unit coupled to the master system unit;
the processor being configured to automatically determine said first, second, third and fourth gain parameters, wherein at least one of the plurality of bi-directional ports is configured to pass DC power and an IF signal with a wire line coupled to the at least one remote unit; and
a user port configured to communicatively couple the processor and a user, wherein the user port is further configured to exchange information between the processor and the user including communication allowing the user to provide information to the processor.

25. The system of claim 24, wherein the processor is configured to receive information regarding power levels at points outside the master system unit and is configured to determine at least one of said gain parameters in response to the power levels.

26. The system of claim 24, wherein the information comprises estimates of the length of wire line to be connected between the master system unit and the at least one remote unit and wherein the processor is configured to determine at least one of said gain parameters in response to the provided estimates.

27. The system of claim 24, wherein the master system unit further comprises a memory coupled to the processor.

28. The system of claim 24, wherein the user port further comprises a modem.

29. The system of claim 24, further comprising detectors placed at locations between the master system unit and the at least one remote unit, wherein the detectors are configured to detect the amount of power in signals transferred between the master system unit and the at least one remote unit.

30. The system of claim 24, wherein the master system unit further comprises a power supply coupled to the master system unit.

31. The system of claim 24, wherein the information comprises system-related information transmitted to the user in response to a user request.

32. The system of claim 24, wherein the user port is further communicatively coupled to a plurality of different communication mediums.

33. A method for automatically adjusting the gain of a signal received by a master system unit, comprising:
splitting the received signal into a plurality of separate signals;
operating a processor to automatically and individually adjust a gain of at least one of the separate signals based, at least in part, on gain parameters, wherein the gain of the at least one of the separate signals is adjusted by individually controlling attenuation of the respective at least one of the separate signals;
amplifying the adjusted at least one of the separate signals;
transmitting the amplified adjusted at least one of the separate signals to an associated remote unit; and
exchanging information between a processor of the master system unit and a user through a user port of the master system unit, the exchanging information including communication allowing the user to provide information to the processor.

34. The method of claim 33, and further comprising:
receiving signals from a plurality of remote units;
amplifying the signals received from the remote units;
operating the processor to automatically and individually adjust gains of the respective amplified received signals by individually controlling attenuation of the respective amplified received signals; and
combining the adjusted amplified received signals to provide a combined signal.

35. The method of claim 34, wherein:
the remote units are coupled to the master system unit with a plurality of wire lines, and
the master system unit is configured to receive a partially processed signal with at least one of the plurality of wire lines coupled to the remote units.

36. The method of claim 35, wherein the partially processed signal is mixed at the remote unit to change frequency.

37. The method of claim 33, wherein exchanging further comprises transmitting system-related information to a user in response to a user request.

38. The method of claim 33, wherein exchanging further comprises communicatively coupling to a plurality of different communication mediums.

39. A master system unit for use in a wireless communication system, the master system unit including an input port, an output port, a plurality of bi-directional ports, a means for combining and splitting, and a processor, the means for combining and splitting further comprising:
a) a means for splitting coupled to the input port and configured to provide a plurality of separate signals based, at least in part, on a received signal;
b) a means for combining coupled to the output port and configured to combine a plurality of adjusted signals;
c) a first circuit comprising a first means for attenuating coupled to the means for splitting and configured to attenuate a first one of said separate signals based, at least in part, on a first gain parameter and a first means for amplifying configured to amplify said attenuated first one of said separate signals, the first means for amplifying being coupled to a first means for duplexing, the first means for duplexing being coupled to a first one of the plurality of bi- directional ports and a second means for amplifying configured to amplify a first signal received from said first one of the bi-directional ports, the second means for amplifying being coupled to a second means for attenuating configured to attenuate said amplified first signals received from said first one of the bi-directional ports, to provide a first one of said adjusted signals based, at least in part, on a second gain parameter, the second attenuator being coupled to the means for combining; and
d) a second circuit comprising a third means for attenuating coupled to the means for splitting and configured to attenuate a second one of said separate signals based, at least in part, on a third gain parameter and a third means for amplifying configured to amplify said attenuated second one of said separate signals, the third means for amplifying being coupled to a second means for duplexing, the second means for duplexing being coupled to a second one of the plurality of bi-directional ports and a fourth means for amplifying configured to amplify a second signal received from said second one of the bi-directional ports, the fourth means for amplifying being coupled to a fourth means for attenuating configured to attenuate said amplified second signal received from said second one of the bi-directional ports, to provide a second one of said adjusted signals based, at least in part, on a fourth gain parameter, the fourth means for attenuating being coupled to the means for combining;

the processor being configured to automatically adjust an amount of gain applied individually to said separate signals and said adjusted signals by determining said first, second, third and fourth gain parameters, wherein at least one of the plurality of bi-directional ports is configured to pass an intermediate-frequency (IF) signal; and wherein the master system unit further comprises a user port configured to communicatively couple the processor and a user, wherein the user port is further configured to exchange information between the processor and the user including communication allowing the user to provide information to the processor.

40. A master system unit for use in a wireless communication system, comprising:
a) a master system unit input port;
b) a master system unit output port;
c) a plurality of bi-directional master system unit ports;
d) a means for passive splitting having a splitter input port and a plurality of splitter output ports, the splitter input port being coupled to the master system unit input port;
e) a means for passive combining having a combiner output port and a plurality of combiner input ports, the combiner output port being coupled to the master system unit output port;
f) a first plurality of means for variable attenuating, each having an attenuator input port and an attenuator output port, each attenuator input port of the first plurality of means for attenuating being coupled to one of the splitter output ports;
g) a second plurality of means for variable attenuating, each having an attenuator input port and an attenuator output port, each attenuator output port of the second plurality of means for attenuating being coupled to one of the combiner input ports;
h) a first plurality of means for amplifying, each having an amplifier input port and an amplifier output port, each the amplifier input port being coupled to the attenuator output port of one of the first plurality of means for attenuating;
i) a second plurality of means for amplifying, each having an amplifier input port and an amplifier output port, each amplifier output port being coupled to one of the attenuator input ports of the second plurality of means for attenuating;
j) a plurality of means for duplexing, each having a duplexer input port, a duplexer output port and a duplexer bi-directional port, each duplexer input port being coupled to one of the output ports of the first plurality of means for amplifying, each duplexer output port being coupled to one of the outputs of the second plurality of means for amplifying, and each duplexer bi-directional port being coupled to one of the master system unit bi-directional ports;
k) a processor configured to automatically adjust individual ones of said means for attenuating to individually control gains of signals transmitted from said splitter output ports and individually control gains of signals received at said combiner input ports; and
a user port configured to communicatively couple the processor and a user, wherein the user port is further configured to exchange information between the processor and the user including communication allowing the user to provide information to the processor.

41. A system for adjusting the gain of a signal comprising:
a master system unit including an input port, an output port, a plurality of bi-directional ports, and a means for combining and splitting, the means for combining and splitting being coupled to the input port, the output port, and the plurality of bi-directional ports, and a processor, the means for combining and splitting further comprising:
a) a means for splitting coupled to the input port and configured to provide a plurality of separate signals based, at least in part, on a received signal;
b) a means for combining coupled to the output port and configured to combine a plurality of adjusted signals;
c) a first circuit comprising a first means for attenuating coupled to the means for splitting and configured to attenuate a first one of said separate signals based, at least in part, on a first gain parameter and a first means for amplifying configured to amplify said attenuated first one of said separate signals, the first means for amplifying being coupled to a first means for duplexing, the first means for duplexing being coupled to a first one of the plurality of bi-directional ports and a second means for amplifying configured to amplify a first signal received from said first one of the bi-directional ports, the second means for amplifying being coupled to a second means for attenuating configured to attenuate said amplified first signals received from said first one of the bi-directional ports, to provide a first one of said adjusted signals based, at least in part, on a second gain parameter, the second attenuator being coupled to the means for combining;
d) a second circuit comprising a third means for attenuating coupled to the means for splitting and configured to attenuate a second one of said separate signals based, at least in part, on a third gain parameter and a third means for amplifying configured to amplify said attenuated second one of said separate signals, the third means for amplifying being coupled to a second means for duplexing, the second means for duplexing being coupled to a second one of the plurality of bi-directional ports and a fourth means for amplifying configured to amplify a second signal received from said second one of the bi-directional ports, the fourth means for amplifying being coupled to a fourth means for attenuating configured to attenuate said amplified second signal received from said second one of the bi-directional ports, to provide a second one of said adjusted signals based, at least in part, on a fourth gain parameter, the fourth means for attenuating being coupled to the means for combining;
e) at least one remote unit coupled to the master system unit;
the processor being configured to automatically determine said first, second, third and fourth gain parameters, wherein at least one of the plurality of bi-directional ports is configured to pass DC power and an IF signal with a wire line coupled to the at least one remote unit; and
a user port configured to communicatively couple the processor and a user, wherein the user port is further configured to exchange information between the processor and the user including communication allowing the user to provide information to the processor.

42. A computer readable medium having instructions stored thereon that when executed by at least one processor performs a method for automatically adjusting the gain of a signal received by a master system unit, the method comprising:
splitting the received signal into a plurality of separate signals;
automatically and individually adjusting a gain of at least one of the separate signals based, at least in part, on gain parameters, wherein the gain of the at least one of the separate signals is adjusted by individually controlling attenuation of the respective at least one of the separate signals;
amplifying the adjusted at least one of the separate signals;
transmitting the amplified adjusted at least one of the separate signals to an associated remote unit; and
exchanging information between a processor of the master system unit and a user through a user port of the master system unit, the exchanging information including communication allowing the user to provide information to the processor.

* * * * *